(12) United States Patent
Dharaiya

(10) Patent No.: US 8,800,728 B2
(45) Date of Patent: Aug. 12, 2014

(54) HEAVY-DUTY VEHICLE BRAKE ASSEMBLY WITH SEALING INTERFACE

(75) Inventor: Dhawal Dharaiya, Twinsburg, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 217 days.

(21) Appl. No.: 13/416,091

(22) Filed: Mar. 9, 2012

(65) Prior Publication Data

US 2012/0228070 A1 Sep. 13, 2012

Related U.S. Application Data

(60) Provisional application No. 61/451,346, filed on Mar. 10, 2011.

(51) Int. Cl.
*F16D 65/08* (2006.01)
*C23C 30/00* (2006.01)

(52) U.S. Cl.
CPC ..................................... *C23C 30/00* (2013.01)
USPC .................. 188/251 R; 188/73.1; 188/250 B; 188/251 M; 188/261; 188/264 G; 29/458; 192/107 M; 192/113.34

(58) Field of Classification Search
CPC ..... F16D 69/02; F16D 69/023; F16D 69/026; F16D 69/0408; F16D 69/0416; F16D 2069/002; F16D 2069/0433; F16D 2069/0441; F16D 51/20; F16D 65/062; F16D 65/08; F16D 65/092; F16D 65/125
USPC ........ 188/251 A, 251 R, 250 B, 73.1, 251 M, 188/261, 264 G; 29/458; 192/107 M, 113.34
See application file for complete search history.

(56) References Cited

U.S. PATENT DOCUMENTS

| 1,796,433 A | 3/1931 | Blume |
| 2,158,337 A | 5/1939 | Rasmussen |
| 2,581,926 A | 1/1952 | Groten et al. |

(Continued)

FOREIGN PATENT DOCUMENTS

JP         02051628 A  *  2/1990  .............. F16D 65/08

OTHER PUBLICATIONS

Remanufactured Brake Shoes With Platinum Shield Coating; brochure; Jan. 2009; entire document; ArvinMeritor, Inc., USA; 2009.

(Continued)

*Primary Examiner* — Anna Momper
*Assistant Examiner* — San Aung
(74) *Attorney, Agent, or Firm* — Dureska, Kennedy & Moore, L.L.C.; David P. Dureska; Edward T. Kennedy

(57) ABSTRACT

A heavy-duty vehicle brake assembly with a sealing interface includes a brake shoe, which includes a shoe table mounted on a web and a brake lining mounted on the shoe table. The shoe table is coated with a zinc-rich coating to form the sealing interface between the brake lining and the shoe table. The sealing interface resists the formation of corrosion cells on the brake shoe table, which in turn reduces the build-up of significant rust between the brake shoe table and the brake shoe lining, thereby preventing cracking and potential dislodging of the lining, while also facilitating replacement of linings when they eventually wear. A method of constructing a heavy-duty vehicle brake assembly with a sealing interface is also provided.

13 Claims, 10 Drawing Sheets

(56) References Cited

U.S. PATENT DOCUMENTS

| | | | |
|---|---|---|---|
| 2,644,551 | A | 7/1953 | Glazebrook et al. |
| 2,742,386 | A | 4/1956 | Bigelow |
| 2,959,150 | A | 11/1960 | Barrett |
| 4,081,307 | A | 3/1978 | Morgan, Jr. |
| 4,694,937 | A | 9/1987 | Jonas |
| 4,858,732 | A | 8/1989 | Taylor, Jr. |
| 4,976,800 | A * | 12/1990 | Edwards ............ 156/151 |
| 5,161,654 | A * | 11/1992 | Valentin ............ 188/251 R |
| 5,261,512 | A | 11/1993 | Young |
| 5,281,481 | A | 1/1994 | Hayward |
| 5,535,858 | A | 7/1996 | Hummel et al. |
| 5,791,443 | A | 8/1998 | Manz |
| 5,836,428 | A | 11/1998 | Young |
| 6,022,502 | A * | 2/2000 | Lockhart et al. ............ 264/113 |
| 6,793,728 | B1 | 9/2004 | Davies et al. |
| 2004/0099493 | A1* | 5/2004 | Himmelsbach et al. .. 188/250 B |
| 2006/0147721 | A1 | 7/2006 | Ueda et al. |
| 2006/0272909 | A1 | 12/2006 | Fuller et al. |
| 2007/0056816 | A1 | 3/2007 | Hayford et al. |
| 2009/0304917 | A1 | 12/2009 | Kihira et al. |

OTHER PUBLICATIONS

Havard Undrum, Silicate- or epoxy zinc primers—The superior protection; Apr. 2006; entire document; Sandefjord, Norway.

Commercial Performance Coatings; 1K Organic Zinc Rich Primer; ZNP-101; product information brochure-CPCPB726; Mar. 2010; entire document; 2010 PPG Industries; Strongsville, Ohio.

Rivera Coatings; RP-2; Zinc—MIO Primer; product information brochure; entire document; Renton, WA.

PPG True Finish Industrial Coatings; Spectracron 611-1K Organiz Zinc Rich Primer; product information brochure; entire document; Sep. 2006; PPG Industries, Inc.

Material Safety Data Sheet-PPG Industries, Inc.; Nov. 21, 2010; Version 12.01; 1K Organic Zinc Rich Primer; ZNP-101; Refinish Products, Strongsville, OH; entire document.

PPG Industrial Coatings; Powder Coatings; PCM70140—ENVIROCON XZR Powder Coat; product information brochure; PPG Industries-Strongsville, OH; May 28, 2011; entire document.

Material Safety Data Sheet-PPG Industries, Inc.; Nov. 8, 2011; Version 13; ENVIROCON XZR; PCM70140; PPG Industries-Pittsburgh, PA; entire document.

Hendrickson; INTRAAX/VANTRAAX Brake/S-CAM Kits/Compoments; Parts List; Lit. No. L1104; Dec. 2009; Revision A; entire document; Canton, OH.

Hendrickson; Technical Procedure; Drum Brake Maintenance Procedures; Lit. No. L974; Feb. 2008; entire document; Canton, OH.

* cited by examiner

HEAVY-DUTY VEHICLE BRAKE ASSEMBLY WITH SEALING INTERFACE

CROSS-REFERENCE TO RELATED APPLICATIONS

This application claims the benefit of U.S. Provisional Patent Application Ser. No. 61/451,346, which was filed on Mar. 10, 2011.

BACKGROUND OF THE INVENTION

1. Technical Field

The invention relates to the art of brakes for heavy-duty vehicles. More particularly, the invention relates to brake shoes of drum brakes for heavy-duty vehicles. Still more particularly, the invention is directed to a sealing interface that is disposed between a brake shoe table and a brake shoe lining by the application of a zinc-rich coating to the shoe table. The sealing interface resists the formation of corrosion cells on the brake shoe table, which in turn reduces the buildup of significant rust between the brake shoe table and the brake shoe lining, thereby preventing cracking and potential dislodging of the lining, while also facilitating replacement of linings when they eventually wear.

2. Background Art

Heavy-duty vehicles, such as trucks and tractor-trailers or semi-trailers, always include brake assemblies that enable the vehicles to stop when traveling. In many cases, these brake assemblies are of the drum brake type. Each drum brake typically includes a pair of brake shoes, and each brake shoe in turn includes a sacrificial, high-coefficient of friction brake lining that is mounted on a metal backing plate, which is known as a shoe table. In the prior art, certain road conditions have created an undesirable condition for brake shoes, which is known in the art as rust jacking.

More particularly, when a heavy-duty vehicle travels over roads and there is moisture on the road surface, road spray may be generated. Road spray is the moisture that is caused to move upward from the road surface by the vehicle tires toward the underside of the vehicle. In addition, cross splash may be generated, which is the splashing of moisture from puddles toward the underside of the vehicle when a vehicle tire contacts a puddle. By contacting the underside of the vehicle, road spray and cross splash contact many exposed components on the lower portion of the vehicle. Because the brake shoes are located on the lower portion of the vehicle and typically are unprotected from road spray and cross splash, when the vehicle travels over wet roads, road spray and cross splash tends to collect on the brake shoes. For the purpose of convenience, reference below shall be made to road spray with the understanding that such reference includes both road spray and cross splash.

It is known in the art that road spray may include salt or other chemicals that are present on the road surface. For example, salt from salt water is often present on roads near a sea, and roads in areas with abundant ice or snow are often treated with certain chemicals for anti-icing or de-icing. Anti-icing and de-icing shall collectively be referred to herein for the purpose of convenience as anti-icing. Such anti-icing chemicals include sodium chloride, calcium chloride, magnesium chloride, and mixtures thereof. In the past, sodium chloride, which is commonly referred to as road salt, had typically been used to treat roads for anti-icing. However, more aggressive anti-icing chemicals have been developed, including calcium chloride and magnesium chloride, each of which will be described in greater detail below. Because road spray includes such salt or other chemicals, when road spray collects on the brake shoes, the salt and/or other chemicals also collect on the brake shoes. The collection of salt and/or anti-icing chemicals, and in particular the more aggressive anti-icing chemicals, has created a condition known in the art as rust jacking.

As mentioned above, in each brake shoe, a brake lining is mounted on a shoe table. To provide secure mounting, the brake lining typically is attached to the shoe table by mechanical fasteners such as rivets, bolts, or the like. However, the use of mechanical fasteners enables small gaps to form in areas of the interface between the brake lining and the shoe table that are between or outside of the fasteners, including the perimeter or the outside edges of this interface. When road spray with salt and/or chemicals collects on the brake shoes, the moisture and salt and/or other chemicals accumulate in the gaps at the perimeter or the side edges of the interface between the brake lining and the shoe table.

In addition, the shoe table is formed with openings that receive the mechanical fasteners which secure the brake lining to the shoe table. In many cases, each shoe table is designed to accommodate several different types of brake linings, each one of which may include a different pattern for the mechanical fasteners. As a result, when the brake lining is attached to the shoe table, the shoe table may include openings that have not received a mechanical fastener. Such un-used openings allow moisture and salt and/or other chemicals to weep or pass through the shoe table and again accumulate at the interface between the brake lining and the shoe table.

The accumulation of moisture and salt and/or other chemicals at the interface between the brake lining and the shoe table causes corrosion cells to form on the shoe table at this interface. The corrosion cells often begin to form on the shoe table at the gaps that are at the perimeter or the side edges of the interface between the brake lining and the shoe table, and at areas in the interface adjacent to un-used fastener openings in the shoe table. The corrosion cells then propagate or spread to other gaps at the interface, and/or to other areas in the interface that are adjacent to un-used shoe table fastener openings. Rust then builds up at the corrosion cells, and once the rust buildup becomes significant, it pushes the brake lining outward from the shoe table, which is a condition known in the art as rust jacking.

In the art, while the formation of any noticeable rust creates the potential for rust buildup and eventual rust jacking, significant rust buildup is generally understood to be a thickness of rust that is sufficient to adversely affect the structure and/or the operation of the brake shoe, as will be described in greater detail below. It is to be understood that reference herein to significant rust buildup is made in such a context, and by way of example, includes an amount of rust that is typically in a thickness range of from about 0.05 inches to about 0.20 inches, or enough rust to form a discrete flake. It is to be further understood that the actual thickness of rust that constitutes significant rust buildup is often dictated by the construction of the specific brake lining that is employed, as some brake linings are capable of accommodating or tolerating more rust buildup than others.

Because the brake lining is secured to the shoe table by mechanical fasteners, once the rust buildup becomes significant, the rust creates an outward force on the brake lining against the fasteners which may cause the brake lining to crack. Once a brake lining cracks, it is no longer useable, and the brake shoe must then be replaced to ensure proper functioning of the vehicle brakes. In some cases, the rust buildup may be extensive enough to dislodge the lining from the mechanical fasteners, requiring immediate replacement of the brake shoe. As a result, rust jacking undesirably reduces the life of the brake shoe, which undesirably increases the cost, time and effort associated with maintaining the vehicle.

Traditionally, brake shoe tables had been coated with water-based paint, which was applied by dip painting, or dipping the brake shoe tables into the paint. Such water-based dip painted brake shoe tables were often able to resist rust jacking when sodium chloride was used to treat roads for anti-icing. However, as described above, calcium chloride has been developed as an anti-icing chemical that is more aggressive than sodium chloride. With the use of calcium chloride as an anti-icing chemical, water-based dip painting has been ineffective in providing a sufficient resistance to the formation of corrosion cells on the shoe table at the interface between the brake lining and the shoe table. Without sufficient resistance to the formation of corrosion cells, rust can build up and rust jacking can occur on such brake shoes having water-based dip painted brake shoe tables.

In addition, severe braking conditions experienced by the vehicle often exacerbate rust jacking in vehicles that employ brakes having water-based dip painted brake shoe tables. More particularly, when drum brakes of a heavy duty vehicle are applied in a severe braking condition, such as a sudden stop or an extended stop, there is slight movement of the brake lining and the shoe table relative to one another. This movement causes the brake lining to scuff the shoe table at the interface between the brake lining and the shoe table, which removes some of the paint of a water-based dip painted brake shoe table. As a result, the bare metal of the shoe table is exposed in the scuff areas. Moisture and salt and/or chemicals that have accumulated at the interface between the brake lining and the shoe table are then able to form corrosion cells in the scuff areas on the shoe table, which may in turn enable rust to build up and lead to rust jacking.

In order to reduce rust jacking on brake shoes having water-based dip painted brake shoe tables, and particularly when calcium chloride is employed as an anti-icing chemical, an alternative process known as electro-coating or e-coating of the brake shoe table was developed in the prior art. In e-coating, an epoxy-based or acrylic-based coating is deposited onto the shoe table in a bath, and an electric current is introduced into the bath to promote a surface reaction on the brake shoe, which enables optimum depositing of the coating. This optimum depositing of the epoxy-based or acrylic-based coating resists the formation of corrosion cells by calcium chloride on the shoe table at the interface between the brake lining and the shoe table. As a result, in situations where anti-icing chemicals that include calcium chloride collect on the brake shoes, e-coating of the brake shoe has been found to reduce rust jacking.

However, the e-coating process involves the purchase and maintenance of costly equipment, causing the process to be undesirably expensive. The e-coating process is also a relatively sensitive process. More particularly, if the conditions and steps of the process, which are known to those skilled in the art, are not performed under optimum conditions, the resulting e-coating may not sufficiently adhere to the surface of the shoe table. If the e-coating does not sufficiently adhere to the shoe table, the coating may separate from the shoe table under performance conditions, which enables corrosion cells to form on the shoe table, in turn creating the possibility that rust jacking still may occur.

In addition, magnesium chloride was developed as an aggressive anti-icing chemical, and has been used alone and in combination with other chemicals. When anti-icing chemicals that include magnesium chloride collect on the brake shoes, e-coating does not provide a sufficient resistance to the formation of corrosion cells on the shoe table at the interface between the brake lining and the shoe table. Without sufficient resistance to the formation of corrosion cells, rust is able to build up and rust jacking is able to occur on brake shoes with such e-coated brake shoe tables.

Moreover, as described above, severe braking conditions cause the brake lining to scuff the shoe table at the interface between the brake lining and the shoe table. This scuffing removes some of the e-coating, resulting in the exposure of the bare metal of the shoe table. Moisture and salt and/or other chemicals that have accumulated at the interface between the brake lining and the shoe table are then able to form corrosion cells in the scuff areas on the shoe table, which may in turn enable rust to build up and lead to rust jacking.

Also, as mentioned above, the brake lining is a sacrificial component that wears out over time, and is intended by manufacturers to be replaced at certain intervals. In order to reduce cost and waste in this replacement, it is desirable to remove the worn brake lining from the shoe table and install a new brake lining on the shoe table, thus re-using the shoe table. The structural strength and durability of a shoe table typically enables the shoe table to be re-used multiple times, thereby desirably reducing the cost of brake repair or replacement. Typically, a principal factor that undesirably limits the number of times a shoe table can be re-used is corrosion or pitting of the shoe table, which is a disadvantage with a brake shoe having an e-coated shoe table. That is, when a shoe table that was previously e-coated is re-used, the coating typically is not sufficient to continue to resist the formation of corrosion cells on the shoe table at the interface between the brake lining and the shoe table, thereby enabling rust jacking to occur. Moreover, if the shoe table is e-coated again, surface imperfections on the shoe table caused by typical wear or previous surface pitting prevent optimum depositing of the coating, also reducing the ability of the coating to resist the formation of corrosion cells on the shoe table at the interface between the brake lining and the shoe table, again enabling rust jacking to occur.

In order to overcome the above-described disadvantages associated with e-coating, other processes were developed in the prior art. One of these prior art processes involves applying coatings to the shoe table that are cured by ultraviolet (UV) light to resist the formation of corrosion cells on the surface of the shoe table at the interface between the brake lining and the shoe table. While such UV-cured coatings sometimes reduce rust jacking, they are often undesirably expensive to apply, and in many cases, do not provide sufficient resistance to the formation of corrosion cells on the shoe table at the interface between the brake lining and the shoe table for a significant length of time, thereby eventually enabling rust jacking to occur anyway. Moreover, when severe braking conditions cause the brake lining to scuff a shoe table with a UV-cured coating, the scuffing removes some of the coating, resulting in the exposure of the bare metal of the shoe table. Moisture and salt and/or chemicals that have accumulated at the interface between the brake lining and the shoe table are then able to form corrosion cells in the scuff areas on the shoe table, which may in turn enable rust to build up and lead to rust jacking.

Another prior art approach to reducing rust jacking when aggressive anti-icing chemicals, such as magnesium chloride, are employed has been to apply a double-sided sheet of adhesive to the shoe table before the brake lining is attached. The adhesive sheet is a high-temperature adhesive composed of an acrylic/polymer material or a urethane-based adhesive material. The adhesive contacts the shoe table and the brake lining in an attempt to impede the passage of moisture and salt and/or chemicals to the interface between the brake lining and the shoe table.

However, as described above, the brake lining is a sacrificial component that wears out over time, and is intended by manufacturers to be replaced at certain intervals. In order to reduce cost and waste in this replacement, it is desirable to remove the worn brake lining from the shoe table and install a new brake lining on the shoe table, thus re-using the shoe table. As mentioned above, it is desirable to re-use a shoe table multiple times in order to desirably reduce the cost of brake repair or replacement. In brake shoes that employ the double-sided sheet of adhesive, the adhesive attachment to both the shoe table and the brake lining makes removal of a worn brake lining from the shoe table extremely difficult and time consuming. As a result, removal of the worn brake lining from the shoe table cannot be performed efficiently or cost-effectively, often resulting in the entire brake shoe being scrapped, which undesirably increases waste and the cost to maintain the heavy-duty vehicle.

As a result, there is a need in the art for a heavy-duty vehicle brake assembly that overcomes the disadvantages of the prior art by providing an economical and effective sealing interface between the shoe table and the brake lining that resists the formation of corrosion cells on the brake shoe table, which in turn reduces the build-up of significant rust between the shoe table and the brake lining, thereby preventing cracking and potential dislodging of the lining, while also facilitating cost-effective replacement of worn linings.

The heavy-duty vehicle brake assembly with a sealing interface of the present invention satisfies these needs, as will be described in detail below.

BRIEF SUMMARY OF THE INVENTION

An objective of the present invention is to provide a heavy-duty vehicle brake assembly with a sealing interface that provides an economical and effective sealing interface between the shoe table and the brake lining.

Another objective of the present invention is to provide a heavy-duty vehicle brake assembly with a sealing interface that resists the formation of corrosion cells on the brake shoe table.

A further objective of the present invention is to provide a heavy-duty vehicle brake assembly with a sealing interface that reduces the build-up of significant rust between the shoe table and the brake lining.

Yet another objective of the present invention is to provide a heavy-duty vehicle brake assembly with a sealing interface that prevents cracking of the brake lining and potential dislodging of the brake lining from the shoe table.

Still another objective of the present invention is to provide a heavy-duty vehicle brake assembly with a sealing interface that facilitates cost-effective replacement of worn brake linings.

These objectives and others are obtained by the heavy-duty vehicle brake assembly with a sealing interface of the present invention. By way of example, the brake assembly includes a brake shoe. The brake shoe includes a shoe table that is mounted on a web, and a brake lining that is mounted on the shoe table. The shoe table is coated with a zinc-rich coating to form the sealing interface between the brake lining and the shoe table, in which the sealing interface resists the formation of corrosion cells on the brake shoe table.

These objectives and others are obtained by the method of foaming a heavy-duty vehicle brake assembly with a sealing interface of the present invention. By way of example, the method includes the steps of providing a brake shoe table, and applying a pre-treatment to the shoe table to optimize the adhesion of a coating to the shoe table. A zinc-rich coating is applied to the shoe table, and a brake lining is mounted on the shoe table. The zinc-rich coating forms the sealing interface between said brake lining and the shoe table to resist the formation of corrosion cells on the brake shoe table.

BRIEF DESCRIPTION OF THE SEVERAL VIEWS OF THE DRAWINGS

The preferred embodiment of the present invention, illustrative of the best mode in which Applicant has contemplated applying the principles, is set forth in the following description and is shown in the drawings, and is particularly and distinctly pointed out and set forth in the appended claims.

Similar numerals refer to similar parts throughout the drawings. The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention is directed to a heavy-duty vehicle brake assembly that includes a sealing interface which is disposed between a brake shoe table and a brake shoe lining of the brake assembly. The sealing interface is formed by the application of a zinc-rich coating to the shoe table. The sealing interface resists the formation of corrosion cells on the brake shoe table, which in turn reduces the build-up of significant rust between the brake shoe table and the brake shoe lining, thereby preventing cracking and potential dislodging of the lining, while also facilitating replacement of linings when they eventually wear.

Figure 1:
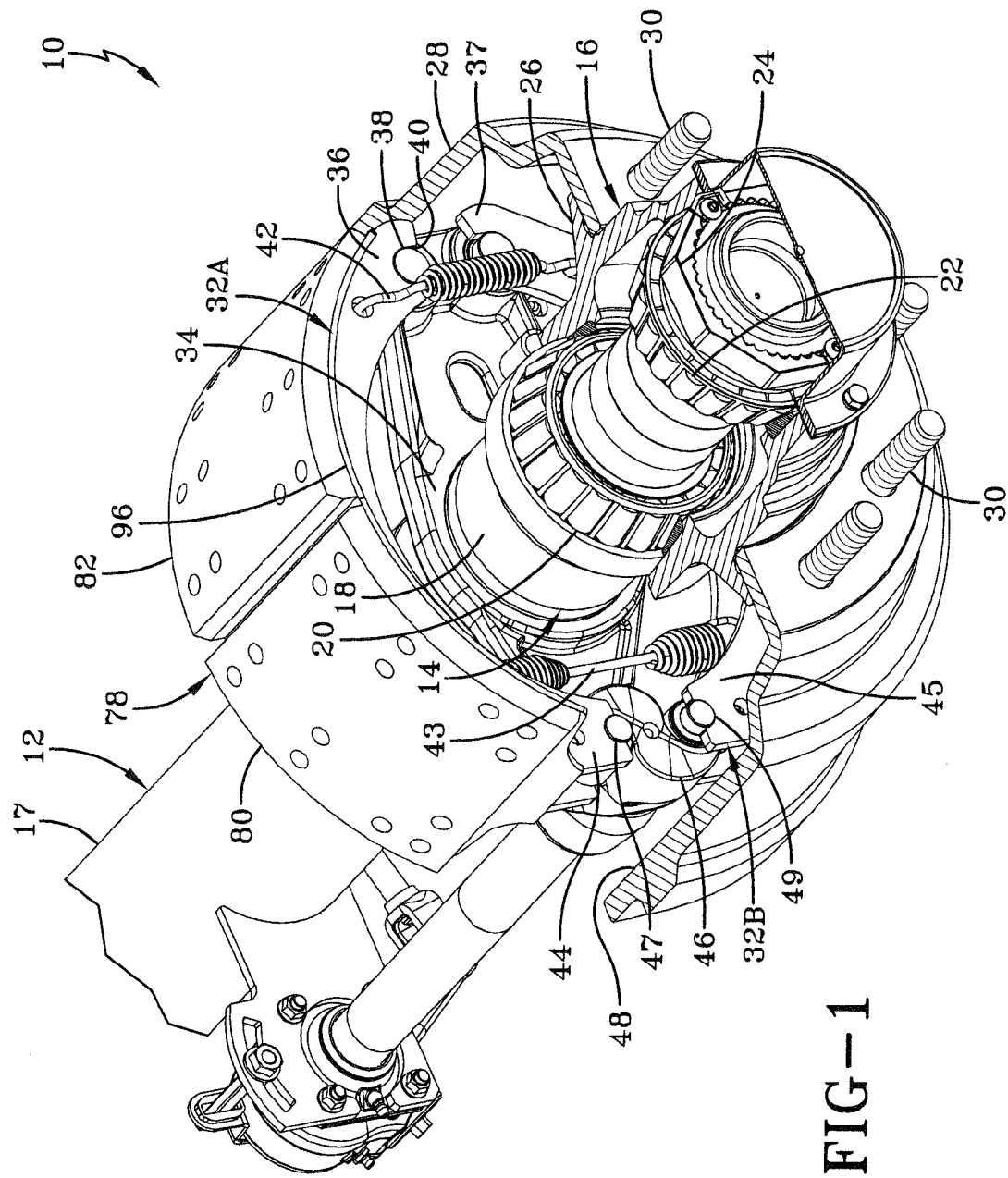
FIG. 1 is a top front perspective view of an exemplary embodiment of a heavy-duty vehicle drum brake assembly with sealing interface of the present invention, shown partially in section and installed on a portion of an axle/suspension system.

Turning now to FIG. 1, an exemplary embodiment of a heavy-duty vehicle drum brake assembly with sealing interface of the present invention is shown and is indicated generally at 10. As mentioned above, heavy-duty vehicles include trucks and tractor-trailers or semi-trailers. Tractor-trailers or semi-trailers typically include configurations in which the vehicles include one or more trailers. Reference herein shall be made generally to a heavy-duty vehicle for the purpose of convenience, with the understanding that such reference includes trucks, tractor-trailers and semi-trailers, and trailers thereof.

A heavy-duty vehicle (not shown) typically includes one or more axle/suspension systems 12, each one of which includes a pair of transversely-spaced suspension assemblies that are connected to an axle 14. Axle 14 extends transversely across the vehicle and has two ends. A wheel end assembly 16 is mounted on each one of the ends of axle 14, as is drum brake assembly 10. For the purposes of convenience and clarity, only one end of axle 14 and its respective wheel end assembly 16 and drum brake assembly 10 are shown and described herein.

More particularly, axle 14 includes a central tube 17, and an axle spindle 18 is integrally connected, by any suitable means such as welding, to each end of the central tube. Wheel end assembly 16 includes a bearing assembly having an inboard bearing 20 and an outboard bearing 22 immovably mounted on the outboard end of axle spindle 18. A spindle nut assembly 24 threadably engages the outboard end of axle spindle 18 and secures bearings 20, 22 in place. A wheel hub 26 is rotatably mounted on inboard and outboard bearings 20, 22 in a manner well known to those skilled in the art.

Drum brake assembly 10 includes a brake drum 28, which is mounted on wheel hub 26 by a plurality of interference-fit studs 30, and a pair of brake shoes 32A and 32B. For the purpose of convenience, brake shoe 32A is referred to herein as an upper brake shoe, and brake shoe 32B is referred to herein as a lower brake shoe. A brake support structure 34, also known in the art as a brake spider, is immovably mounted on axle spindle 18. Upper brake shoe 32A is rotatably fixed at a first end 36 to brake spider 34 by an anchor pin 38 that extends through an opening 40 formed in the brake spider. Lower brake shoe 32B is also rotatably fixed at a first end 37 to brake spider 34 by an anchor pin (not shown) that extends through an opening (not shown) formed in the brake spider.

A first resilient retaining member 42, which preferably is a coiled tension spring and is referred to in the art as a retaining spring, is connected to and extends between upper brake shoe first end 36 and lower brake shoe first end 37. Retaining spring 42 retains first end 36, 37 of respective brake shoes 32A, 32B against brake spider 34 when the vehicle brakes are not actuated. A second resilient retaining member 43, which preferably is a coiled tension spring and is referred to in the art as a return spring, is connected to and extends between a second end 44 of upper brake shoe 32A and a second end 45 of lower brake shoe 32B. Return spring 43 retains second end 44, 45 of respective brake shoes 32A, 32B against a respective roller 47, 49 and an actuator 46 when the vehicle brakes are not actuated.

In response to a brake command, actuator 46, which is shown by way of example as an S-cam, engages first and second rollers 47, 49, respectively. First roller 47 in turn contacts second end 44 of upper brake shoe 32A, and second roller 49 in turn contacts second end 45 of lower brake shoe 32B. Actuator 46 causes each roller 47, 49 to move in a generally radially outward direction, reacting against anchor pin 38 and overcoming the force of springs 42 and 43. When the force of springs 42 and 43 is overcome, each brake shoe 32A, 32B moves radially outwardly to contact an inner surface 48 of brake drum 28 to thereby slow or stop the vehicle. When the braking operation is complete, retaining spring 42 and return spring 43 move each brake shoe 32A, 32B to a non-applied position, as known in the art. It is to be understood that actuators other than S-cam 46 may be used without affecting the overall concept or operation of the invention, including hydraulic cylinders or other actuators known to those skilled in the art.

Figure 2:
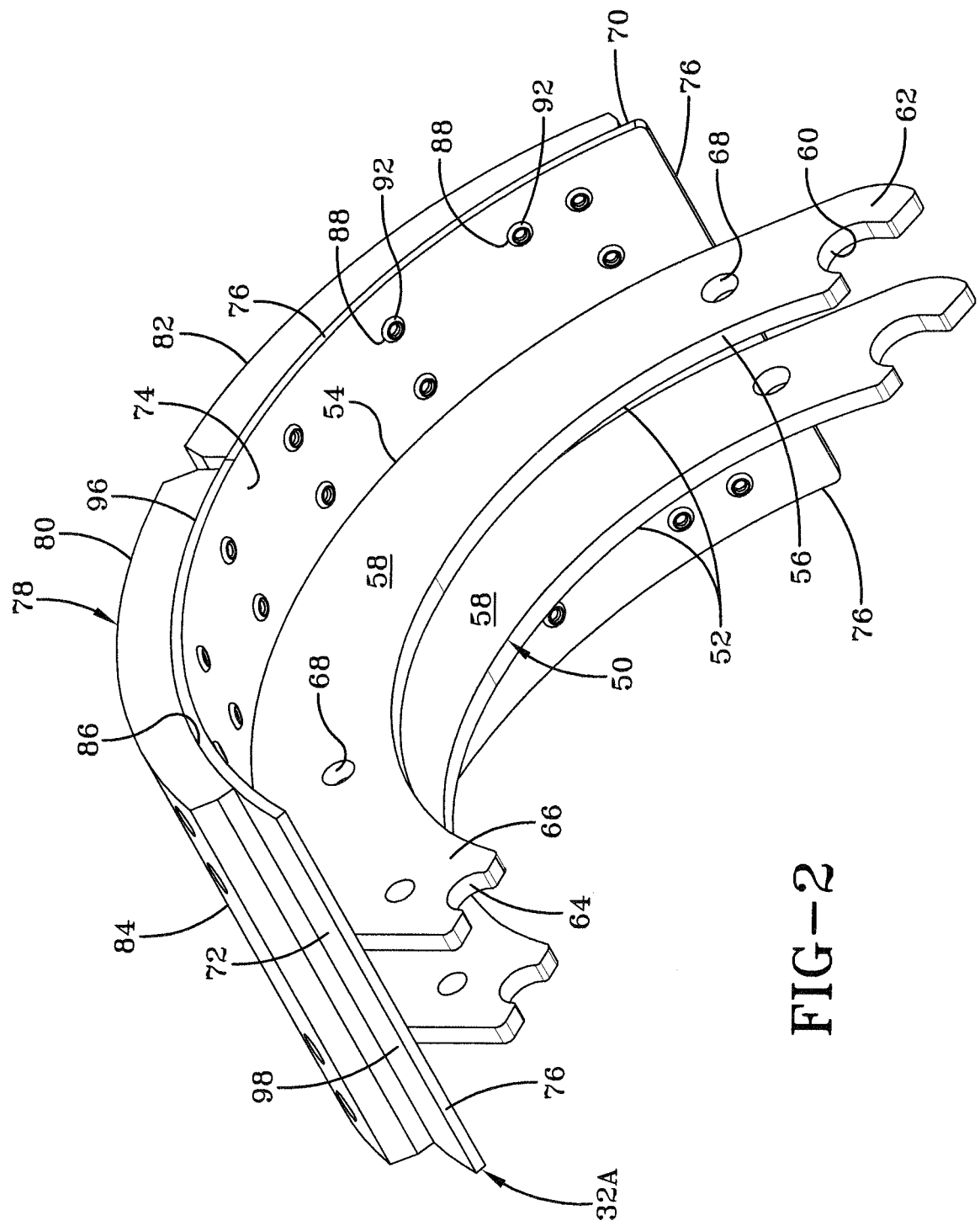
FIG. 2 is a bottom front perspective view of one of the brake shoes of the heavy-duty vehicle drum brake assembly shown in FIG. 1.
Figure 3:
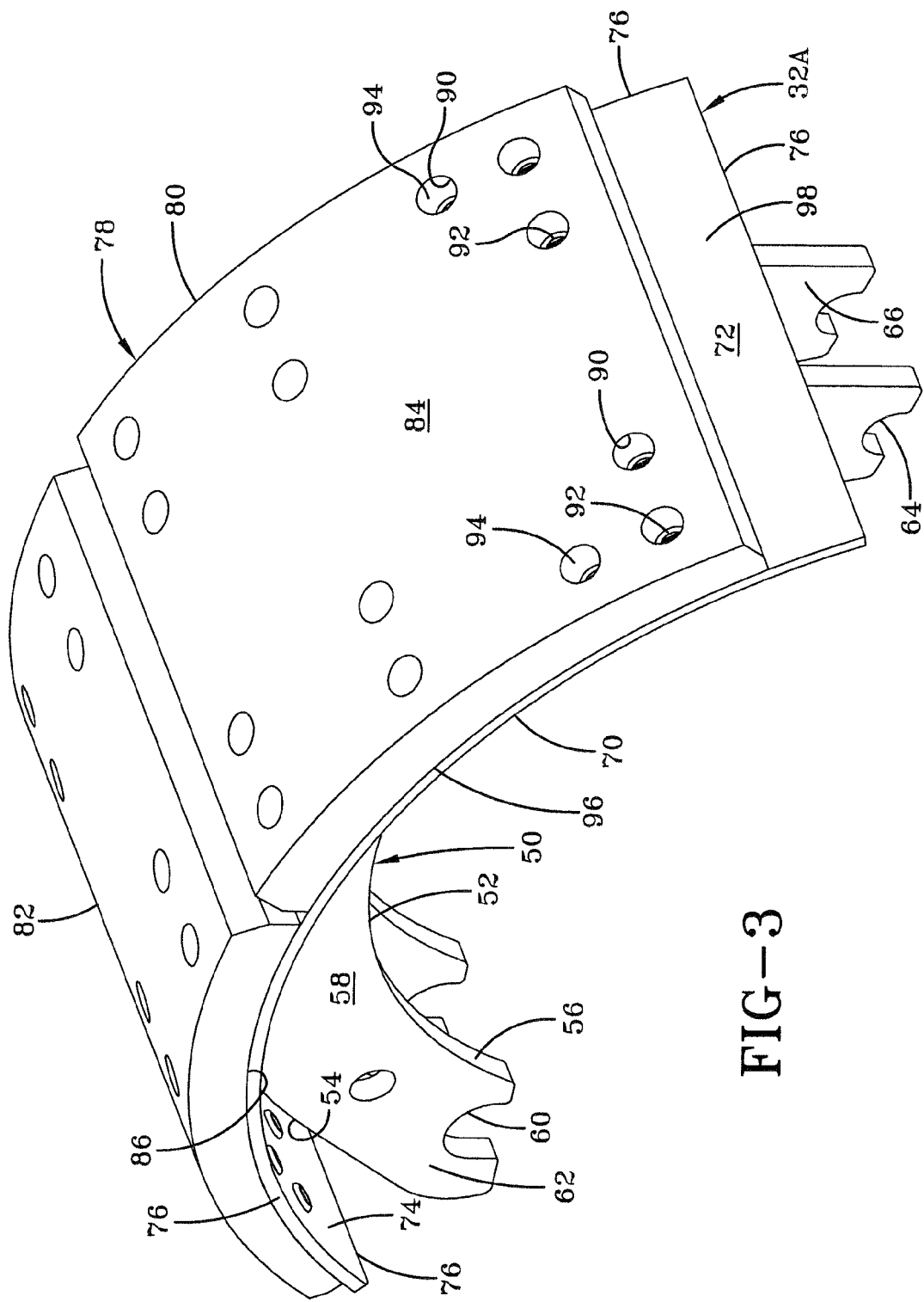
FIG. 3 is a top front perspective view of the brake shoe shown in FIG. 2.

Turning now to FIGS. 2 and 3, upper brake shoe 32A of drum brake assembly with sealing interface of the present invention 10 is shown in further detail. It is to be understood that upper brake shoe 32A is shown in FIGS. 2 and 3 for the purpose of convenience, as the same structures and features are included on lower brake shoe 32B. Brake shoe 32A is arcuately-shaped and includes a semicircular web 50 that is constructed of one or more struts or runners 52. Each strut 52 is formed from a high strength metal and has a curved outer convex surface 54, a curved inner concave surface 56 and substantially flat side surfaces 58. A first notch 60 is formed in a first end 62 of each strut 52 for seating on anchor pin 38 (FIG. 1), and a second notch 64 is formed in a second end 66 of each strut for seating on roller 47. Openings 68 are formed in each strut 52 to receive respective ends of springs 42, 43.

Brake shoe 32A also includes a shoe table 70 that is mounted on web 50. More particularly, shoe table 70 includes a convex outer or top surface 72, a concave inner surface 74, and outside edges 76. Shoe table 70 is a generally rectangularly shaped plate that preferably is formed from a metal, such as steel, and is curved about a radius that corresponds to the curvature of outer convex surface 54 of each strut 52. This curvature of shoe table 70 enables concave inner surface 74 of the shoe table to be rigidly attached to outer convex surface 54 of each strut 52 by means known in the art, such as by welding. When more than one strut 52 is employed as shown in FIGS. 2 and 3, the struts typically are transversely spaced apart in a parallel manner proximate a linear centerline of shoe table 70. Of course, other configurations for struts 52 are possible depending on design considerations, such as struts that taper toward one another, and/or struts that include bends, kinks or curves along their respective lengths.

Brake shoe 32A further includes a brake lining 78, which in turn typically includes a pair of brake pads 80 and 82. It is to be understood that several smaller brake pads or a single larger brake pad may be employed rather than brake pads 80, 82, without affecting the overall concept or operation of the invention. Each brake pad 80, 82 is a generally rectangularly-shaped block formed from a frictional material as known to those skilled in the art. Each brake pad 80, 82 includes a convex outer surface 84 for engaging brake drum inner surface 48 (FIG. 1) and a concave inner surface 86 which mates with convex outer or top surface 72 of shoe table 70.

To facilitate secure attachment of pads 80, 82 of brake lining 78 to shoe table 70, a plurality of fastener openings 88 are formed in the shoe table, and a plurality of fastener openings 90 are formed in each pad. Each one of openings 90 formed in pads 80, 82 aligns with a selected one of openings 88 formed in shoe table 70. A mechanical fastener 92, such as a rivet, bolt, or other means known in the art, is inserted through aligned ones of fastener openings 88, 90 formed in brake shoe table 70 and pads 80, 82, respectively, to thereby secure the pads of brake lining 78 to the shoe table. It is to be understood that shoe table 70 is designed to selectively accommodate several different types of pads 80, 82, and different types of pads may include different patterns of fastener openings 90. As a result, shoe table 70 may be formed with more than one pattern of openings 88 in order to accommodate different types of pads 80, 82.

As shown in FIG. 3, each fastener opening 90 formed in pads 80, 82 includes an enlarged recess 94 foamed adjacent each pad outer surface 84 to ensure that fasteners 92 seat well below the pad outer surface to prevent the fasteners from undesirably engaging brake drum inner surface 48. In this manner, fasteners 92 securely mount pads 80, 82 and thus brake lining 78 to shoe table 70. It is to be understood that certain ones of openings 88 in shoe table 70 which do not align with openings 90 in pads 80, 82 do not receive a fastener and remain un-used, being covered by the pads.

Figure 4:
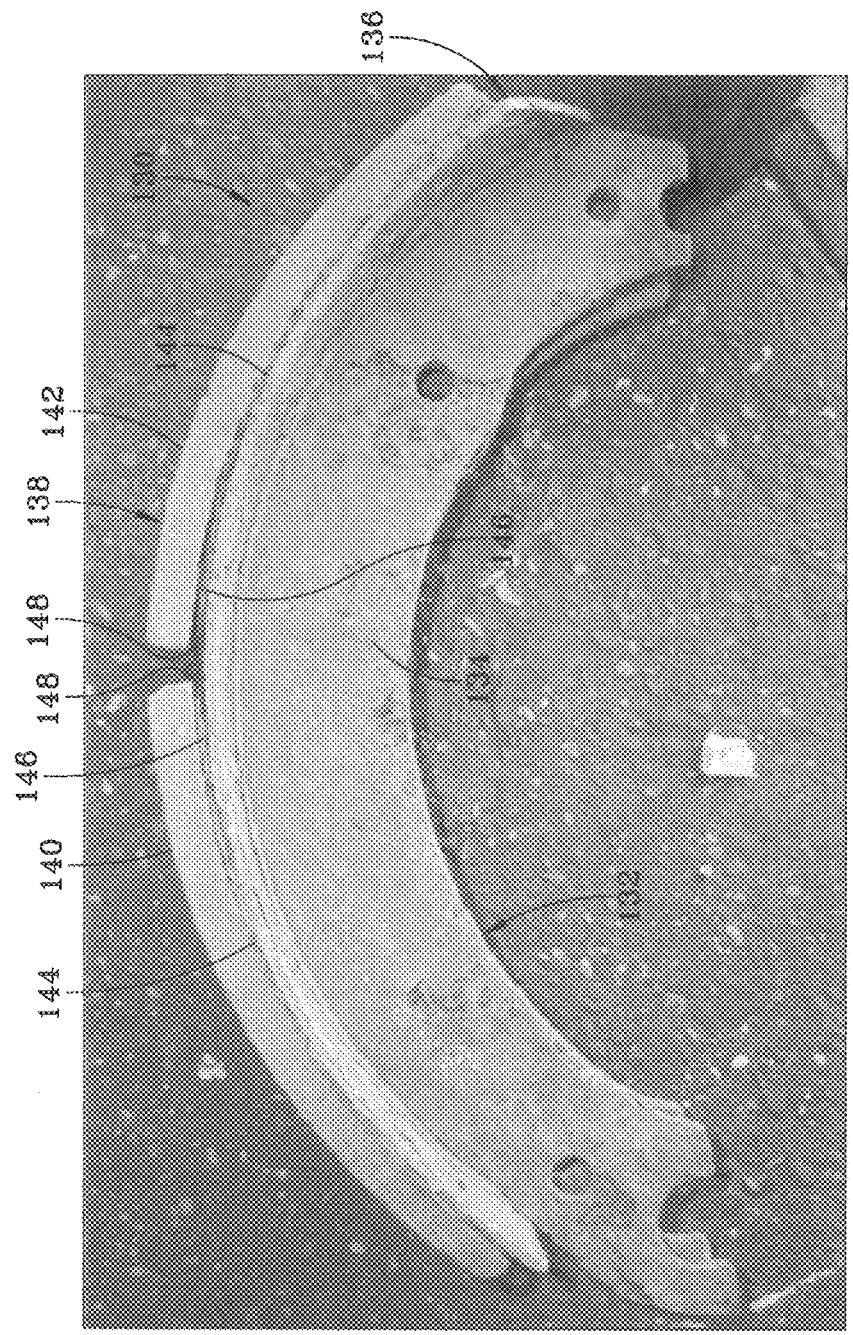
FIG. 4 is a photograph showing a side elevational view of a brake shoe of a first prior art heavy-duty vehicle drum brake assembly, in which the brake shoe includes a water-based dip painted shoe table and has experienced rust jacking.

In order to illustrate the problem of rust jacking, a first prior art brake shoe of a heavy-duty vehicle drum brake assembly is shown in FIG. 4 and is indicated at 130. First prior art brake shoe 130 includes a semicircular web 132 that is made up of one or more struts or runners 134. Brake shoe 130 also includes a shoe table 136 that is mounted on web 132 by means known in the art, such as by welding. Brake shoe 130 further includes a brake lining 138, which in turn includes a pair of brake pads 140 and 142.

Shoe table 136 of brake shoe 130 is a water-based dip painted brake shoe table. With a water-based dip painted brake shoe table 136, brake shoe 130 typically was resistant to rust jacking when sodium chloride was used to treat roads for anti-icing. However, when calcium chloride was developed as an anti-icing chemical that was more aggressive than sodium chloride, water-based dip painted brake shoe 130 could not prevent rust jacking. More particularly, with the use of calcium chloride as an anti-icing chemical, corrosion cells (not shown) were able to form at interface 144 between brake lining 138 and shoe table 136. Rust 146 then built up at the corrosion cells, and as the rust buildup became significant, it pushed pads 140, 142 of brake lining 138 outward from shoe table 136, as shown by gaps 148, thereby creating the condition known as rust jacking.

As described above, because brake lining 138 is secured to shoe table 136 by mechanical fasteners (not shown), significant buildup of rust 146 creates an outward force on the brake lining against the fasteners, which may cause pads 140, 142 of the brake lining to crack, requiring replacement of brake shoe 130. As a result, rust jacking undesirably reduces the life of the brake shoe, which undesirably increases the cost, time and effort associated with maintaining the vehicle.

Returning now to FIGS. 2 and 3, rust jacking is reduced or prevented by a sealing interface 96 of heavy-duty vehicle drum brake assembly 10 of the present invention. Sealing interface 96 is disposed between shoe table 70 and pads 80, 82 of brake lining 78 and is formed by the application of a zinc-rich coating 98 to the shoe table. More particularly, zinc-rich coating 98 is preferably a primer that is an organic epoxy, acrylic or urethane primer, an inorganic primer, or a polyester-based coating. Zinc-rich coating 98 may be in a powder form or a liquid/suspension form before being applied to shoe table 70.

When zinc-rich coating 98 is in a powder form before being applied to shoe table 70, the coating preferably includes a zinc content that is in a range of from about ten (10) percent zinc to about ninety-nine (99) percent zinc by weight in a dried film. More preferably, zinc-rich coating 98 includes a zinc content that is in a range of from about seventy (70) percent zinc to about ninety (90) percent zinc by weight in a dried film.

Preferably, when zinc-rich coating 98 is in a powder form before being applied to shoe table 70, the coating includes a percentage of solids that is in a range of from about sixty (60) percent to about one-hundred (100) percent by weight. An exemplary zinc-rich coating 98 in a powder form before being applied to shoe table 70 is most preferably an epoxy powder coating sold by PPG Industries under the brand name Envirocron® XZR Powder Coat, having a composition of: from about sixty (60) to one about hundred (100) percent zinc powder; from about five (5) to about ten (10) percent bisphenol-A-(epichlorhydrin); from about five (5) to about ten (10) percent phenol; from about one (1) to about five (5) percent zinc oxide; from about one (1) to about five (5) percent epoxy resin; and from about zero point one (0.1) to about one (1) percent bisphenol A.

The application of zinc-rich coating 98 in a powder form includes preparation of shoe table 70, and optionally also struts 52, before pads 80, 82 are attached to the shoe table. The preparation includes cleaning or washing shoe table 70, and optionally also struts 52, to remove any oil or dirt from outer or top surface 72 of the shoe table, as known to those skilled in the art. Next, a pre-treatment that is known to those skilled in the art may be applied to shoe table 70, and in particular to outer or top surface 72 of the brake shoe table, and optionally also struts 52, to optimize the adhesion of zinc-rich coating 98 to the shoe table. For example, a phosphate pre-coat may be sprayed onto shoe table 70, or the shoe table may be dipped into a bath of the phosphate pre-coat. Exemplary phosphate pre-coats include iron phosphate, zinc phosphate, zirconium phosphate, and/or manganese phosphate. Of course, other pre-treatment methods known to those skilled in the art may be performed, such as silane coating, shot blasting/shot cleaning, and the like. In addition, the cleaning of shoe table 70 may optionally be combined with pre-treatment of the table using one-step cleaning and pretreatment methods or products known to those skilled in the art, such as the ambient one-step cleaning and pretreatment product sold by Calvary Industries, Inc. under the brand name Enviroprep®.

Zinc-rich coating 98 then is applied to shoe table 70, and optionally also struts 52. When zinc-rich coating 98 is in powder form, it is preferably applied by spraying, although other means known to those skilled in the art for applying powder coatings may be used. A particularly preferred method of applying zinc-rich coating 98 in powder form to shoe table 70 is electrostatic spraying, which is a method known to those skilled in the art and involves electrically charging the sprayed particles with an electrode or an electrostatic field, and oppositely charging or grounding the shoe table, thereby enabling optimum application of the zinc-rich coating on the shoe table as a powder coat.

In addition, zinc-rich coating 98 preferably is applied to shoe table 70, and optionally also struts 52, in one coat, although multiple coats may be employed, depending on specific requirements. Preferably, when zinc-rich coating 98 is applied to shoe table 70 as a powder coat, the coating is in a thickness that is about at least one point zero (1.0) thousandths of an inch (mils) dry film thickness. More preferably, zinc-rich coating 98 is applied to shoe table 70 in a thickness of from about one point five (1.5) to about two point zero (2.0) mils wet film thickness.

It is to be understood that any preparation, pre-treatment, and/or coating of struts 52 in addition to shoe table 70 is contemplated for the purpose of convenience and other processing considerations, as the preparation, pre-treatment, and/or coating of the shoe table and its outer surface 72 is of primary importance.

When zinc-rich coating 98 is in a liquid/suspension form before being applied to shoe table 70, the coating preferably includes a zinc content that is in a range of from about ten (10) percent zinc to about ninety-nine (99) percent zinc by weight in a dried film. More preferably, zinc-rich coating 98 includes a zinc content that is in a range of from about seventy (70) percent zinc to about ninety-six (96) percent zinc by weight in a dried film. Most preferably, zinc-rich coating 98 includes a zinc content that is in a range of from about eighty-five (85) percent zinc to about eight-nine (89) percent zinc by weight in a dried film.

Preferably, when zinc-rich coating 98 is in a liquid/suspension form before being applied to shoe table 70, the coating includes a percentage of solids that is in a range of from about fifty (50) percent to about ninety (90) percent by weight, or from about ten (10) percent to about fifty (50) percent by volume. More preferably, zinc-rich coating 98 includes a percentage of solids of about seventy (70) percent by weight, or about thirty (30) percent by volume. In addition, zinc-rich coating 98 preferably includes a maximum particle size of zinc of about 100 microns in the coating suspension.

An exemplary zinc-rich coating 98 in a liquid/suspension form before being applied to shoe table 70 is most preferably an organic epoxy primer sold by PPG Industries under the brand names ZNP-101 Organic Zinc Rich Primer or Spectracon® 611-1K Organic Zinc Rich Primer, having a composition of: from about thirty (30) to sixty (60) percent zinc powder; from about seven (7) to about thirteen (13) percent magnesium chloride; from about five (5) to about ten (10) percent Toluene; from about three (3) to about seven (7) percent butanone; from about one (1) to about five (5) percent diacetone alcohol; from about (1) to about five (5) percent Acetone; from about one (1) to about five (5) percent Zinc Oxide; from about zero point five (0.5) to about one point five (1.5) percent Silica; from about zero point one (0.1) to about one (1) percent xylene; and from about zero point one (0.1) to about one (1) percent Ethylbenzene.

The application of zinc-rich coating 98 in a liquid/suspension form includes preparation of shoe table 70, and optionally also struts 52, before pads 80, 82 are attached to the shoe table. The preparation includes cleaning or washing shoe table 70, and optionally also struts 52, to remove any oil or dirt from outer or top surface 72 of the shoe table, as known to those skilled in the art. Next, a pre-treatment that is known to those skilled in the art may be applied to shoe table 70, and in particular to outer or top surface 72 of the brake shoe table, and optionally also struts 52, to optimize the adhesion of zinc-rich coating 98 to the shoe table. For example, a phosphate pre-coat may be sprayed onto shoe table 70, or the shoe table may be dipped into a bath of the phosphate pre-coat. Exemplary phosphate pre-coats include iron phosphate, zinc phosphate, zirconium phosphate, and/or manganese phosphate. Of course, other pre-treatment methods known to those skilled in the art may be performed, such as silane coating, shot blasting/shot cleaning, and the like. In addition, the cleaning of shoe table 70 may optionally be combined with pre-treatment of the table using one-step cleaning and pre-treatment methods or products known to those skilled in the art, such as the ambient one-step cleaning and pretreatment product sold by Calvary Industries, Inc. under the brand name Enviroprep®.

Zinc-rich coating 98 then is applied to shoe table 70, and optionally also struts 52. When zinc-rich coating 98 is in a liquid/suspension form, it is preferably applied by spraying, dipping, or other means for applying liquid/suspension coatings known to those skilled in the art. In addition, zinc-rich coating 98 preferably is applied to shoe table 70, and optionally also struts 52, in one coat, although multiple coats may be employed, depending on specific requirements.

Preferably, when zinc-rich coating 98 is applied to shoe table 70 as a liquid/suspension coat, the coating is in a thickness that is about at least one point zero (1.0) mils wet film thickness. More preferably, zinc-rich coating 98 is applied to shoe table 70 in a thickness of from about two (2) to about six (6) mils wet film thickness. Still more preferably, zinc-rich coating 98 is applied to shoe table 70 in a thickness of from about two point two (2.2) to about five (5) mils wet film thickness. Most preferably, zinc-rich coating 98 is applied to shoe table 70 in a thickness of from about two point four (2.4) to about four point five (4.5) mils wet film thickness.

It is to be understood that any preparation, pre-treatment, and/or coating of struts 52 in addition to shoe table 70 is contemplated for the purpose of convenience and other processing considerations, as the preparation, pre-treatment, and/or coating of the shoe table and its outer surface 72 is of primary importance.

It is to be understood that other coatings, such as Zinc-Aluminum coatings, and coatings that employ combinations of Zinc and other elements, may be used without affecting the overall concept or operation of the invention. For example, zinc-rich coating 98 optionally includes compositions of other materials or elements with zinc, such as micaceous iron oxide (MIO), cadmium, aluminum, stainless steel, tin, brass, and/or manganese. In addition, coatings known to those skilled in the art, such as Geomet® coatings, Magna coatings, Dacromet coatings, and MIO coatings may be used alone in zinc-rich coating 98 or in combination with other zinc or other elements or materials. An exemplary optional zinc-rich coating 98 is an organic MIO primer sold by Rivera Coatings under the brand name RP-2 Zinc-MIO Primer. When RP-2 Zinc-MIO Primer is employed as a liquid/suspension coating, zinc-rich coating 98 is applied to shoe table 70 in a thickness of from about six (6) to about fourteen (14) mils wet film thickness; more preferably in a thickness of from about six point five (6.5) to about thirteen point five (13.5) mils wet film thickness; and most preferably in a thickness of from about seven (7) to about thirteen (13) mils wet film thickness.

Zinc-rich coating 98 thus is an economical, readily-available coating material that is economical and easy to apply to shoe table 70. The application of zinc-rich coating 98 to shoe table 70 creates sealing interface 96 between pads 80, 82 of brake lining 78 and the shoe table. Sealing interface 96 unexpectedly retards the passage and resulting accumulation of moisture and corrosive salt and/or anti-icing chemicals between brake lining 78 and shoe table 70, thereby resisting the formation of corrosion cells and rust, which in turn reduces the possibility of rust jacking.

In addition, as will be described in greater detail below, zinc-rich coating 98 increases the friction between pads 80, 82 of brake lining 78 and shoe table 70. This increased friction reduces the scuffing of shoe table 70 during severe braking conditions, which reduces the tendency for the bare metal of the shoe table to be exposed, providing increased resistance to the formation of corrosion cells and rust, which in turn desirably reduces the possibility of rust jacking. In addition, as will be described below, zinc-rich coating 98 provides galvanic protection to further resist the formation of corrosion cells on shoe table 70 in any areas where the bare metal of the shoe table may be exposed, thereby again reducing the possibility that rust jacking may occur.

Heavy-duty vehicle drum brake assembly with sealing interface of the present invention 10 was tested for resistance to corrosion and thus to rust jacking in comparison to certain prior-art heavy-duty vehicle drum brake assemblies. More particularly, brake shoe 32A, 32B with its respective shoe table 70 including zinc-rich coating 98 (FIGS. 1-3 and 8), a prior art brake shoe 100 with an e-coated shoe table 102 (FIGS. 5A and 5B), a prior art brake shoe 104 with a cured paint shoe table 108 (FIGS. 6A and 6B) that has been promoted in the art as an improvement over e-coating, and a prior art brake shoe 106 with a UV-cured paint shoe table 110 (FIG. 7), were subject to corrosion testing.

More specifically, each brake shoe 32A, 32B, 100, 104, 106 was placed in a rotor stroker to generate heat from high-temperature braking cycles, and thus simulate the brake heat and work of severe brake operating conditions.

After the rotor stroker simulation, brake shoes 32A, 32B, 100, 104, 106 were subjected to Society of Automotive Engineers (SAE) J2334 test for corrosion resistance. In the SAE J2334 test, test specimens are placed in an enclosed chamber and exposed to a changing climate that consists of a three-part repeating cycle. The first part of the cycle is six hours of exposure of the test specimens to a water fog/condensing humidity climate of one hundred percent (100%) relative humidity (RH) at a temperature of fifty (50) degrees Celsius (C). The second part of the cycle is fifteen minutes of immersion of the test specimens in, or a direct spray on the test specimens of, salt water at ambient temperature. The third part of the cycle is seventeen (17) hours and forty-five (45) minutes of air drying of the test specimens in a climate of fifty percent (50%) RH at a temperature of sixty (60) degrees C. Forty cycles of the test were repeated. At the conclusion of forty cycles of the J2334 test, pads 80, 82 were removed from each brake shoe 32A, 32B, 100, 104, 106, and the outer surface of each respective shoe table 70, 102, 108, 110 was examined.

Figure 5A:
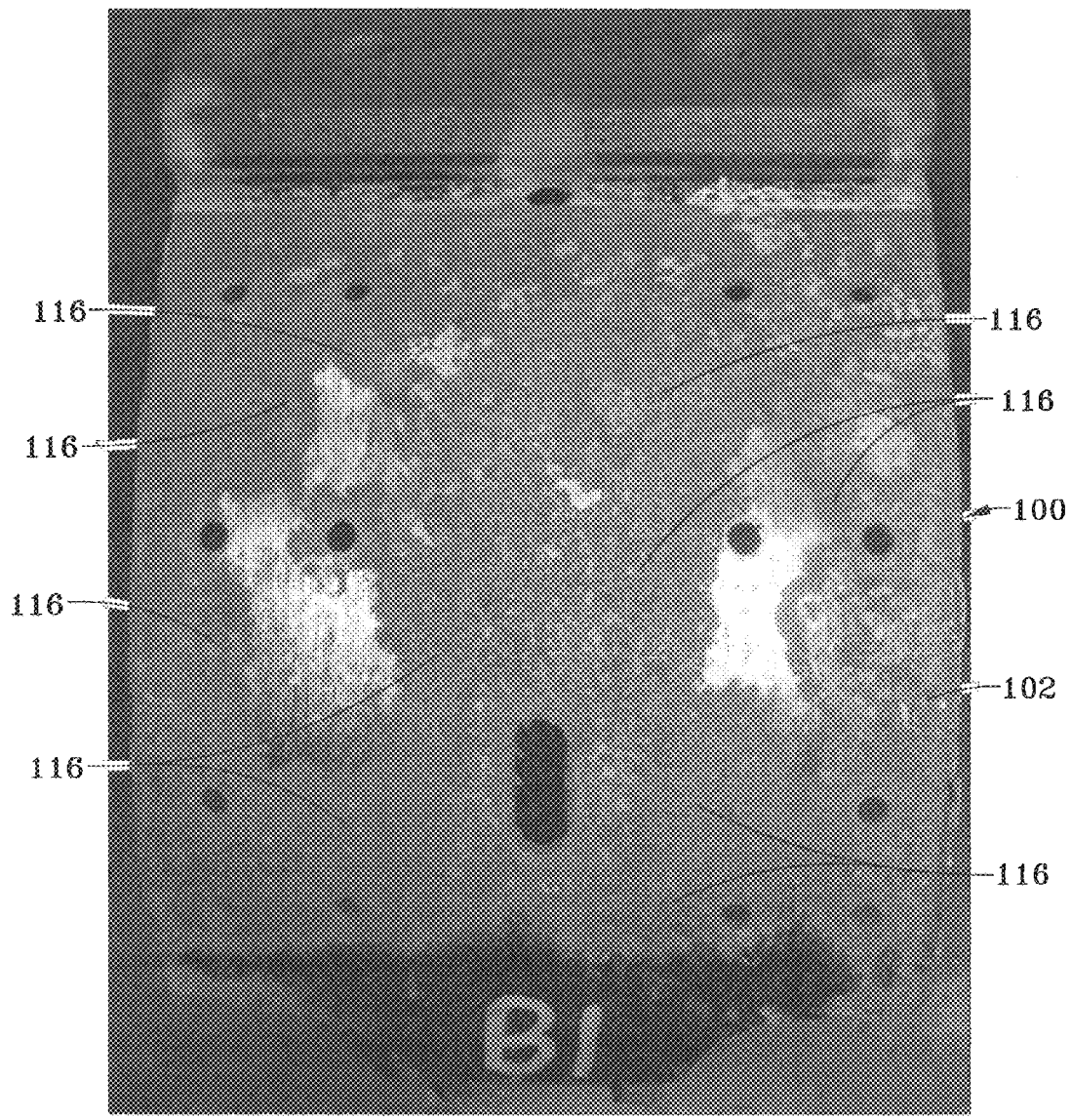
FIG. 5A is a photograph of the top rear surface of a shoe table of a brake shoe of a second prior art heavy-duty vehicle drum brake assembly, in which the shoe table has been e-coated, after testing for rust build-up and removal of the brake lining.
Figure 5B:
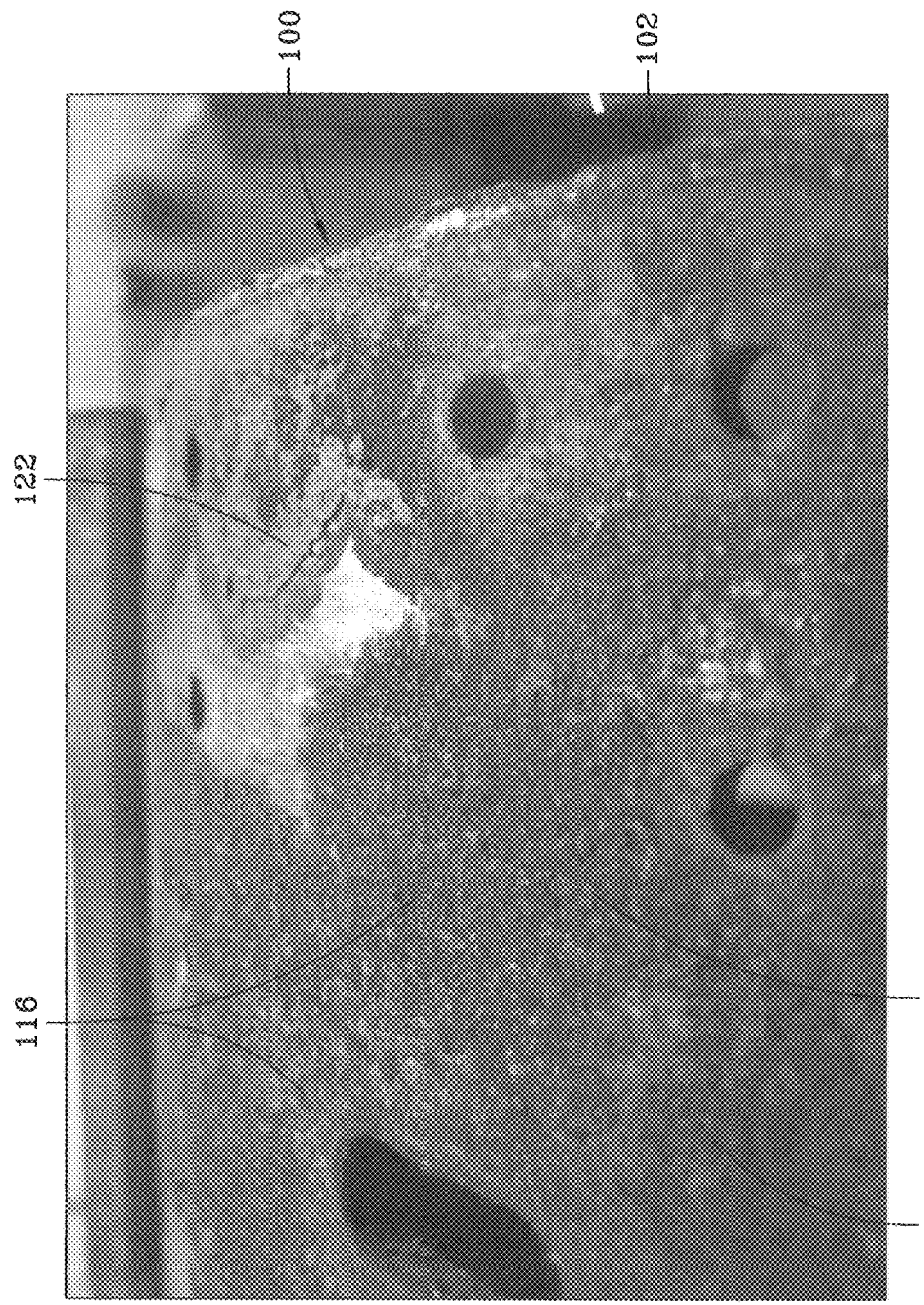
FIG. 5B is a close-up photograph of a portion of the brake shoe table shown in FIG. 5A.

Turning first to FIGS. 5A and 5B, prior art brake shoe 100 with an e-coated shoe table 102 is shown after testing. As shown in FIG. 5A, e-coated prior art brake shoe 100 exhibits substantial rust formation 116 across most of the surface of shoe table 102. Moreover, as shown in FIG. 5B, some of rust formation 116 is extremely thick, forming significant rust buildup 122, which likely would result in rust jacking.

Figure 6A:
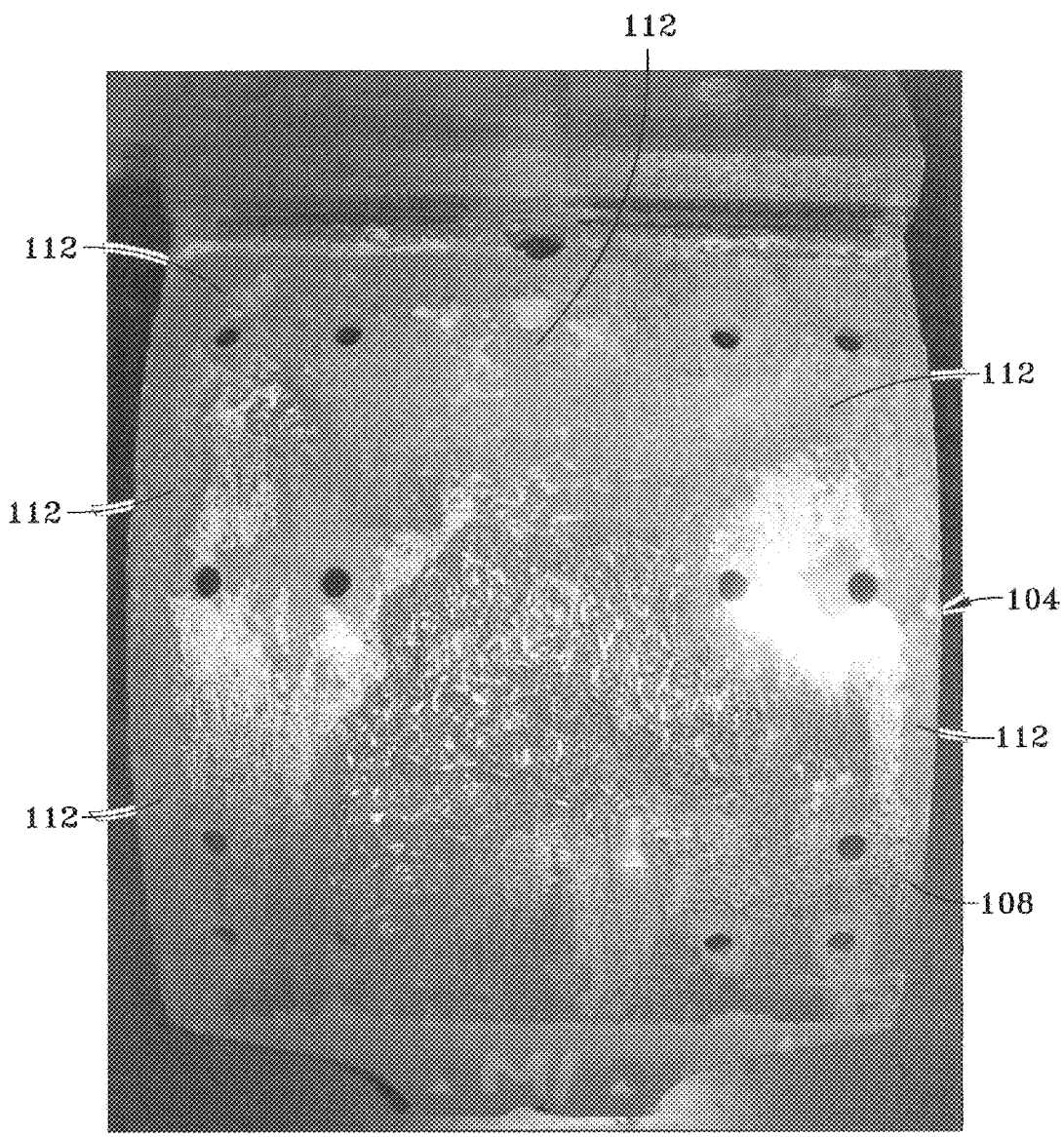
FIG. 6A is a photograph of the top rear surface of a shoe table of a brake shoe of a third prior art heavy-duty vehicle drum brake assembly, in which the shoe table includes a cured paint coating that has been promoted in the art as an improvement over e-coating, after testing for rust build-up and removal of the brake lining.
Figure 6B:
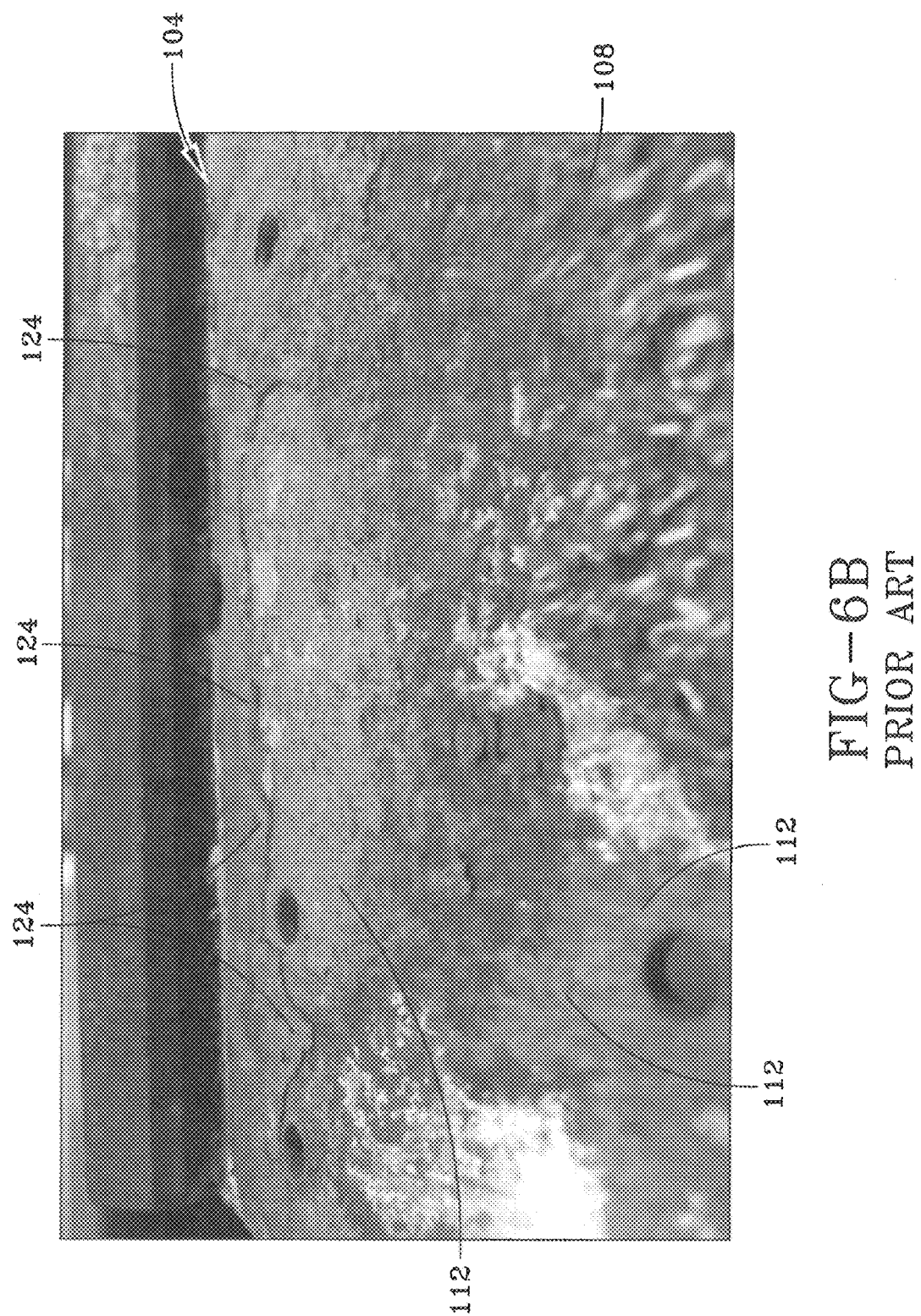
FIG. 6B is a close-up photograph of a portion of the brake shoe table shown in FIG. 6A.

With reference to FIGS. 6A and 6B, a prior art brake shoe 104 with a shoe table 108 including a cured paint surface, which has been promoted in the art as an improvement over e-coating, is shown after testing. As shown in FIG. 6A, cured paint prior art brake shoe 104 exhibits substantial rust formation 112 about the edges and other areas of shoe table 108. Moreover, as shown in FIG. 6B, some of rust formation 112 is extremely thick, forming significant rust buildup 124, which would likely result in rust jacking.

Figure 7:
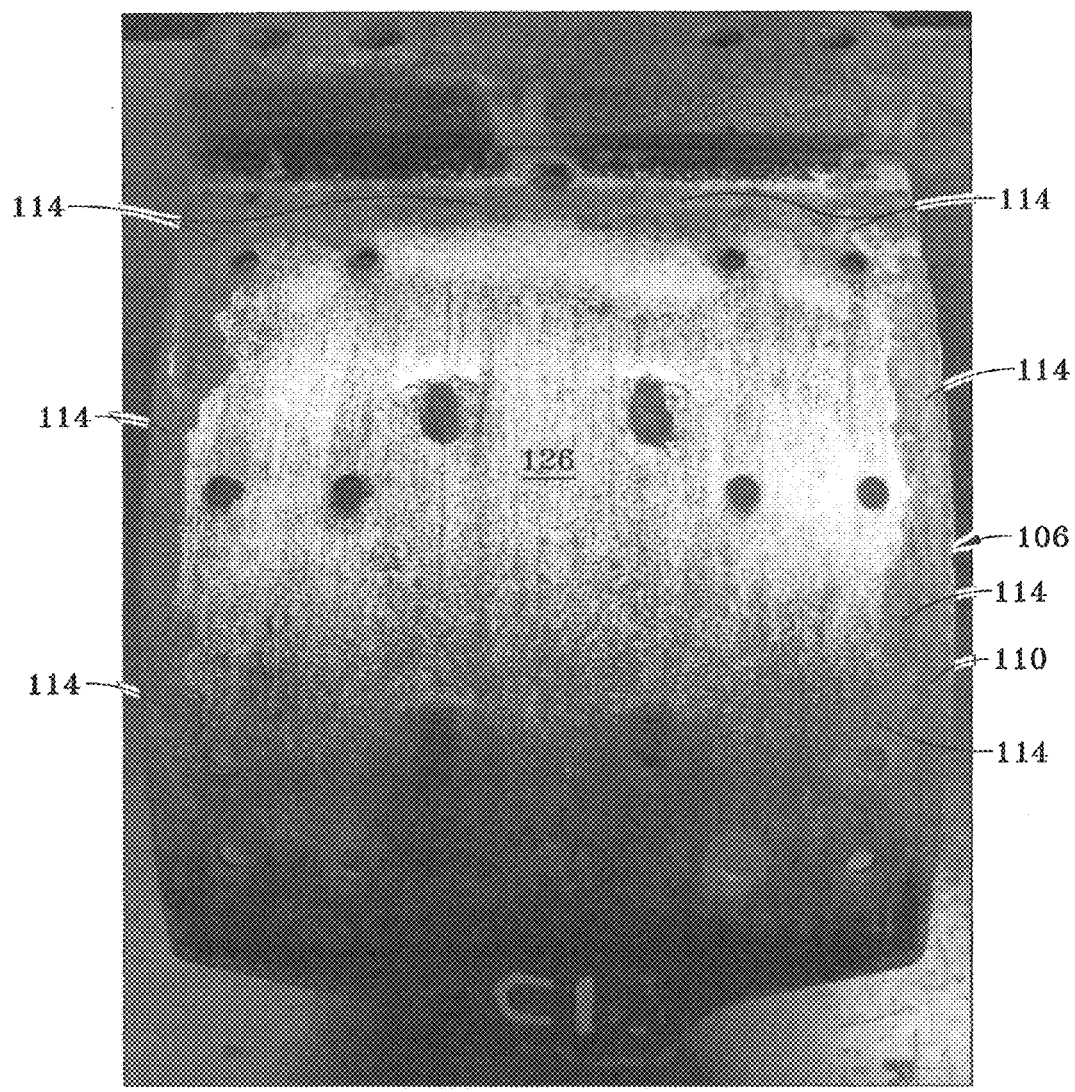
FIG. 7 is a photograph of the top rear surface of a shoe table of a brake shoe of a fourth prior art heavy-duty vehicle drum brake assembly, in which the shoe table includes a UV-cured paint coating, after testing for rust build-up and removal of the brake lining.

Turning to FIG. 7, a prior art brake shoe 106 with a shoe table 110 including UV-cured paint is shown after testing. UV-cured paint prior art brake shoe 106 exhibits substantial rust formation 114 about the edges of shoe table 110. Moreover, a shiny central area 126 is present on shoe table 110, which indicates that the UV-cured paint did not adhere to the surface of the shoe table. If shoe table 110 were exposed to a corrosive environment for a longer time period, it is likely that significant additional rust would form on shoe table 110, thereby likely resulting in rust jacking.

Figure 8:
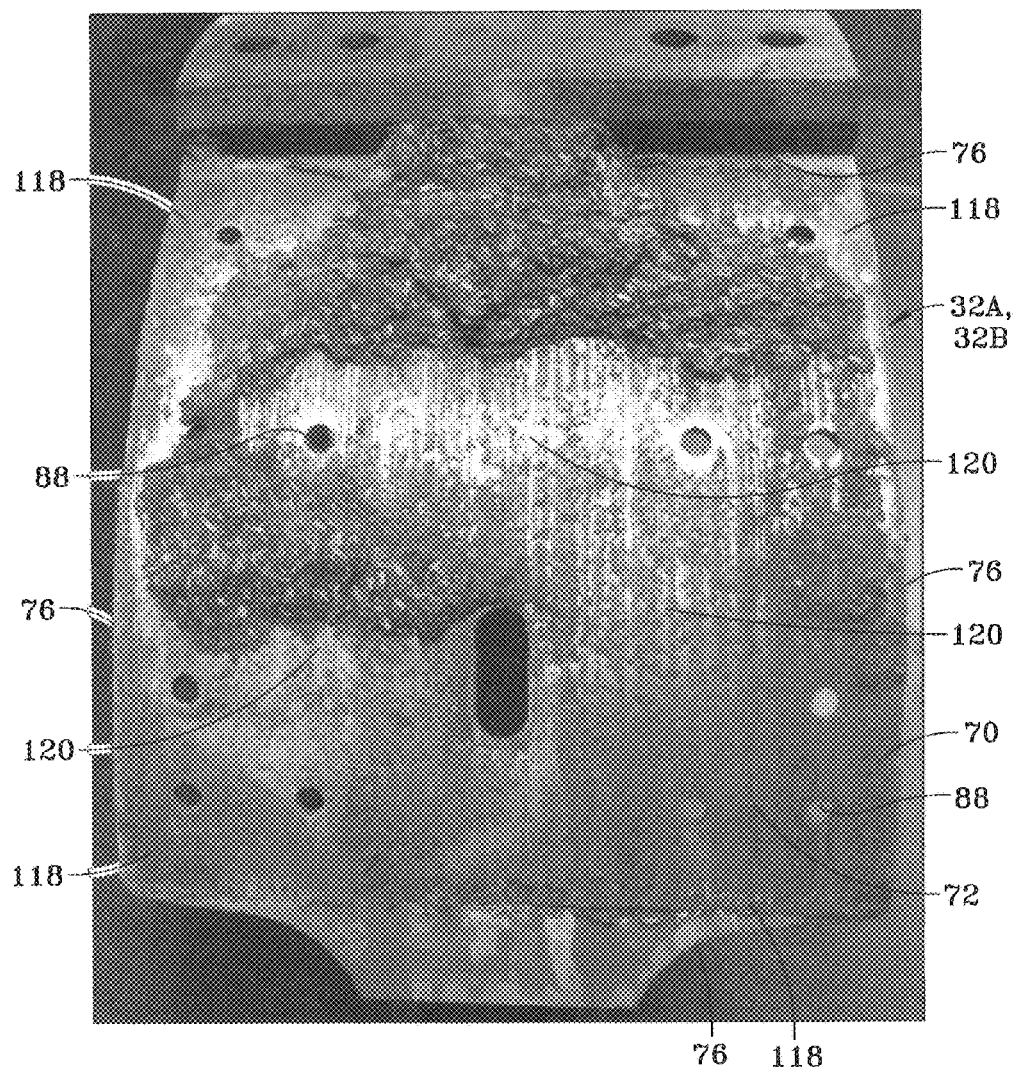
FIG. 8 is a photograph of the top rear surface of a shoe table of a brake shoe of a heavy-duty vehicle drum brake assembly with sealing interface of the present invention, after testing for rust build-up and removal of the brake lining.

With reference now to FIG. 8, and in contrast to prior art brake shoes 100, 104, 106, respectively, brake shoes 32A, 32B of heavy-duty vehicle drum brake assembly with sealing interface 96 of the present invention 10 exhibit minimal rust formation. Specifically, minor rust formation 118 occurred generally at the corners of shoe table 70, with little or no rust formation adjacent shoe table outside edges 76 or shoe table openings 88. Moreover, distinct bonding areas 120 were present on shoe table outer surface 72, in which striations indicate a fusing of the shoe table outer surface to pads 80, 82. However, the fusing was not great enough to prevent efficient removal of pads 80, 82 from shoe table 70. As a result, the use of zinc-rich coating 98 to create sealing interface 96 enables cost-effective removal and replacement of brake lining 78, while protecting brake shoes 32A, 32B from significant rust buildup and rust jacking.

The fusing of pads 80, 82 to shoe table 70 that is enabled by zinc-rich coating 98 effectively creates a greater bond between the pads and the shoe table. This bond increases the effectiveness of sealing interface 96 between pads 80, 82 of brake lining 78 and shoe table 70, further slowing or preventing the accumulation of moisture and corrosive salt and/or anti-icing chemicals, and the resulting formation of corrosion cells and rust, which in turn can lead to rust jacking.

In addition, the fusing of pads 80, 82 to shoe table 70 increases the friction between the pads and the shoe table. More particularly, zinc-rich coating 98 of sealing interface 96 includes a coefficient of friction that is greater than that of prior art e-coating and paint coatings, which provides increased adhesion of pads 80, 82 to shoe table 70. As a result, when the brakes of the vehicle are applied in a severe braking condition, the movement of pads 80, 82 and shoe table 70 relative to one another is decreased. The decrease in such relative movement reduces the tendency of pads 80, 82 to scuff shoe table 70, which in turn reduces the amount of bare metal that is exposed on the shoe table. By reducing the amount of bare metal that is exposed on shoe table 70, zinc-rich coating 98 of sealing interface 96 provides increased resistance to the formation of corrosion cells and rust, which in turn desirably reduces the possibility of rust jacking.

Moreover, zinc-rich coating 98 of sealing interface 96 provides galvanic protection to further resist the formation of corrosion cells on shoe table 70 in any areas where the bare metal of the shoe table may be exposed. More particularly, in the event that scuffing of shoe table 70 does occur, the solution of moisture and salt and/or chemicals from road spray is an electrolyte solution. In the presence of an electrolyte solution, the steel of shoe table 70 forms a cathode and zinc-rich coating 98 forms an anode. Being a cathode, the steel of shoe table 70 does not corrode, while zinc-rich coating 98, being an anode and being disposed adjacent any bare metal of the shoe table, preferentially corrodes to protect the metal of the shoe table. In this manner, zinc-rich coating 98 provides galvanic protection to resist the propagation of corrosion cells on shoe table 70, and thus reduces rust buildup and the possibility of rust jacking. It is to be understood that, in order to provide galvanic protection, zinc-rich coating 98 preferably includes any element or compound that is more galvanically active than steel and which can be incorporated into a paint or coating material. For example, while zinc-rich coating 98 preferably includes zinc, it may optionally include compositions of other materials or elements with zinc, such as micaceous iron oxide (MIO), cadmium, aluminum, stainless steel, tin, brass, and/or manganese.

In this manner, heavy-duty vehicle brake assembly 10 with sealing interface 96 that is disposed between shoe table 70 and pads 80, 82 of brake lining 78 by the application of zinc-rich coating 98 to the shoe table provides an easy-to-apply, economical and effective sealing interface between the shoe table and brake lining 78. Sealing interface 96 resists the formation of corrosion cells on brake shoe table 70, which in turn reduces the build-up of rust between the shoe table and pads 80, 82 of brake lining 78, desirably reducing the likelihood of rust jacking.

In addition, sealing interface 96 still allows a relatively easy and efficient removal of pads 80, 82 from shoe table 70, thereby enabling cost-effective removal and replacement of brake linings 78 when they wear out. Sealing interface 96 thus finds application in brake shoes 32A, 32B for new heavy-duty vehicle brake assemblies 10; for new parts used in the repair and/or replacement of brake shoes employed in previously manufactured heavy-duty vehicle brake assemblies; and for reworked parts used in the repair and/or replacement of brake shoes employed in previously manufactured heavy-duty vehicle brake assemblies, in which a worn brake lining is removed from the shoe table and a new lining is installed on the re-used shoe table.

Sealing interface 96 also increases the friction between pads 80, 82 of brake lining 78 and shoe table 70, thereby reducing the scuffing of the shoe table during severe braking conditions. Such a reduction in scuffing reduces the tendency for the bare metal of the shoe table to be exposed, and thus provides increased resistance to the formation of corrosion cells and rust, which in turn desirably reduces the possibility of rust jacking. Moreover, zinc-rich coating 98 of sealing interface 96 provides galvanic protection to further resist the formation of corrosion cells on shoe table 70 in any areas where the bare metal of the shoe table may be exposed, thereby reducing the possibility that rust jacking may occur.

The present invention also includes a method of assembling, manufacturing, constructing, and/or forming a heavy-duty vehicle brake assembly with sealing interface 96. The method includes steps in accordance with the description that is presented above and shown in FIGS. 1-3 and 8.

It is to be understood that the structure of the above-described heavy-duty vehicle brake assembly with sealing interface may be altered or rearranged, without affecting the overall concept or operation of the invention. It is also to be understood that the above-described method of assembling, manufacturing, constructing, and/or forming a heavy-duty vehicle brake assembly with sealing interface may be altered or rearranged, without affecting the overall concept or operation of the invention. It is to be further understood that the present invention finds application in types of brake systems or brake components for heavy-duty vehicles other than those shown and described herein and which are known to those skilled in the art, without affecting the concept or operation of the invention. While reference herein has been made generally to a heavy-duty vehicle for the purpose of convenience, it has been with the understanding that such reference includes trucks, tractor-trailers or semi-trailers, and trailers thereof.

Accordingly, the improved heavy-duty vehicle brake assembly with sealing interface is simplified, provides an effective, safe, inexpensive, and efficient structure and method which achieves all the enumerated objectives, provides for eliminating difficulties encountered with prior art heavy-duty vehicle brake assemblies, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to an exemplary embodiment. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved heavy-duty vehicle brake assembly with sealing interface is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A heavy-duty vehicle brake assembly with a sealing interface, comprising:
   a brake shoe including a shoe table mounted on a web; and
   a brake lining mechanically fastened to said shoe table, wherein the shoe table is coated with a zinc-rich coating that includes a zinc content of at least about seventy percent zinc by weight to form said sealing interface between said brake lining and said shoe table, whereby the sealing interface resists the formation of corrosion cells on the brake shoe table.

2. The heavy-duty vehicle brake assembly with a sealing interface of claim 1, wherein said zinc-rich coating includes a primer that is selected from the group consisting of an organic epoxy, an acrylic primer, a urethane primer, an inorganic primer, and a polyester-based coating.

3. The heavy-duty vehicle brake assembly with a sealing interface of claim 1, wherein said zinc-rich coating is a powder coating that includes a zinc content that is in a range of from about seventy percent zinc to about ninety percent zinc by weight in a dried film.

4. The heavy-duty vehicle brake assembly with a sealing interface of claim 1, wherein said zinc-rich coating is applied as a liquid coating which includes a zinc content that is in a range of from about seventy percent zinc to about ninety-six percent zinc by weight in a dried film.

5. The heavy-duty vehicle brake assembly with a sealing interface of claim 4, wherein said zinc-rich coating is applied as a liquid coating which includes a zinc content that is in a range of from about eighty-five percent zinc to about eighty-nine percent zinc by weight in a dried film.

6. The heavy-duty vehicle brake assembly with a sealing interface of claim 1, wherein said zinc-rich coating includes a percentage of solids in a range of from about fifty percent to about one hundred percent by weight.

7. The heavy-duty vehicle brake assembly with a sealing interface of claim 6, wherein said zinc-rich coating includes a percentage of solids in a range of from about sixty percent to about one hundred percent by weight.

8. The heavy-duty vehicle brake assembly with a sealing interface of claim 7, wherein said zinc-rich coating includes a percentage of solids in a range of from about sixty percent to about ninety percent by weight.

9. The heavy-duty vehicle brake assembly with a sealing interface of claim 8, wherein said zinc-rich coating includes a percentage of solids of about seventy percent by weight.

10. The heavy-duty vehicle brake assembly with a sealing interface of claim 1, wherein said zinc-rich coating includes a percentage of solids in a range of from about ten percent to about fifty percent by volume.

11. The heavy-duty vehicle brake assembly with a sealing interface of claim 10, wherein said zinc-rich coating includes a percentage of solids of about thirty percent by volume.

12. The heavy-duty vehicle brake assembly with a sealing interface of claim 1, wherein said zinc-rich coating includes a maximum particle size of zinc of about one hundred microns in a coating suspension.

13. The heavy-duty vehicle brake assembly with a sealing interface of claim 1, wherein said zinc-rich coating includes a composition of zinc and at least one of micaceous iron oxide, cadmium, aluminum, stainless steel, tin, brass, and manganese.

* * * * *